(12) United States Patent
Guerrieri

(10) Patent No.: US 6,857,771 B2
(45) Date of Patent: Feb. 22, 2005

(54) LIGHT STICK WITH LED LIGHT SOURCE

(75) Inventor: Salvatore Guerrieri, New York, NY (US)

(73) Assignee: Acolyte Technologies LLC., New York, NY (US)

( * ) Notice: Subject to any disclaimer, the term of this patent is extended or adjusted under 35 U.S.C. 154(b) by 11 days.

(21) Appl. No.: 10/385,354

(22) Filed: Mar. 10, 2003

(65) Prior Publication Data

US 2004/0179372 A1 Sep. 16, 2004

(51) Int. Cl.$^7$ ............................................. F21L 15/04
(52) U.S. Cl. ..................... 362/555; 362/202; 362/184; 362/186; 362/800
(58) Field of Search .................. 362/31, 555, 187, 362/184, 202, 800, 102

(56) References Cited

U.S. PATENT DOCUMENTS 5,079,679 A * 1/1992 Chin-Fa ....................... 362/102
5,392,203 A * 2/1995 Harris, Jr. ..................... 362/186
5,980,063 A * 11/1999 Ford et al. .................... 362/186

* cited by examiner

*Primary Examiner*—Stephen Husar
*Assistant Examiner*—Anabel Ton
(74) *Attorney, Agent, or Firm*—Abelman, Frayne & Schwab

(57) ABSTRACT

A light stick is formed from an elongated, light-transmitting member having a plurality of grooves formed in its exterior surface and an aperture at one end for receiving a light source, such as a light-emitting diode (LED). The light from the LED is directed into the interior of the elongated member. The grooves or other recesses, reflect the light traveling along the length of the elongated member, radiating the light outwardly to enhance the brightness of the light emitted from the exterior surface along the longitudinal axis of the elongated member.

18 Claims, 2 Drawing Sheets

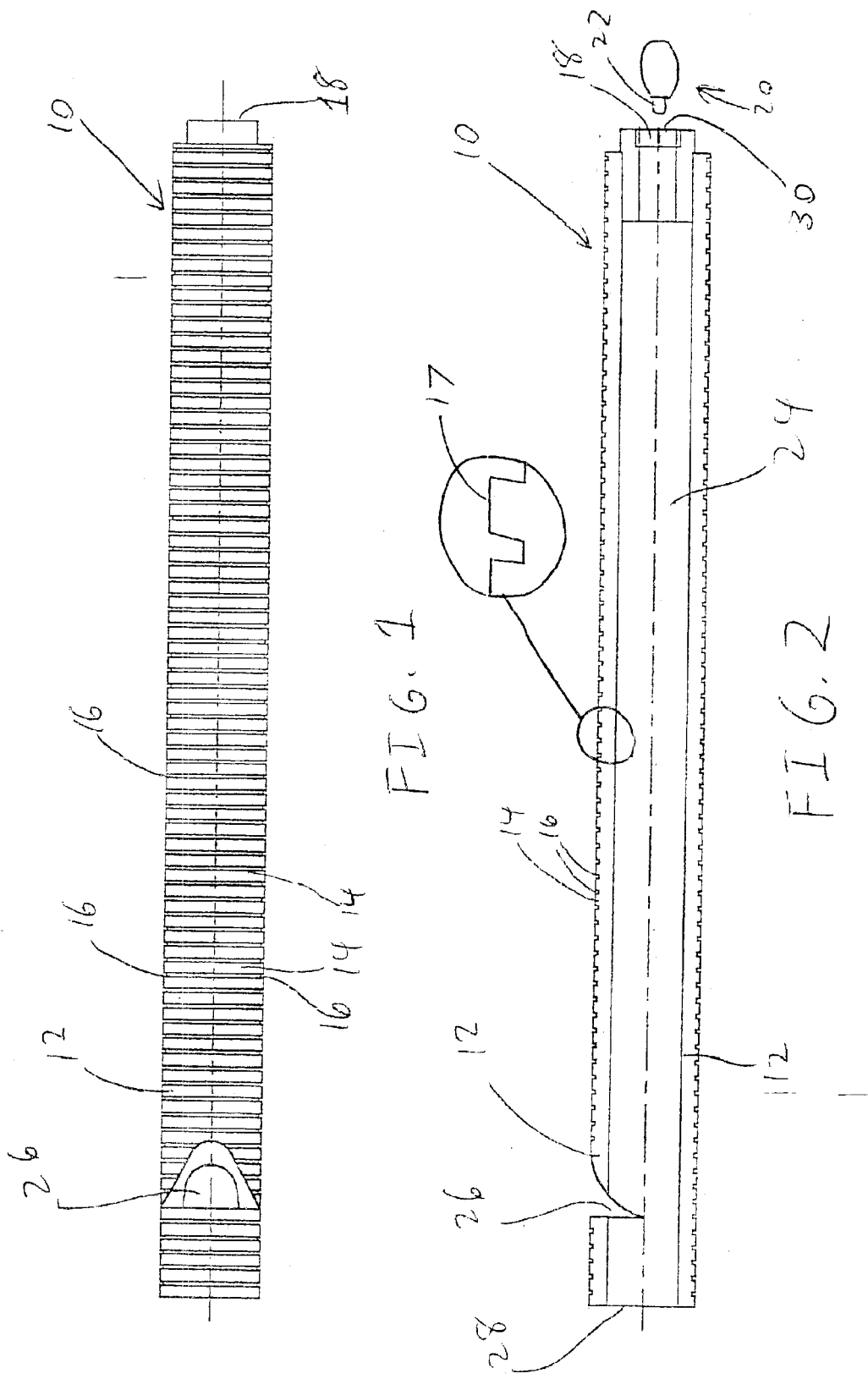

LIGHT STICK WITH LED LIGHT SOURCE

FIELD OF THE INVENTION

This invention relates to illumination devices, and in particular to a light stick utilizing a light emitting diode (LED) as a light source.

BACKGROUND OF THE INVENTION

Various hand-held and elongated devices, commonly known as light sticks, are known which provide broad or area illumination as opposed to focused lighting from flashlights.

Prior art light sticks utilize luminescent chemicals having a limited and non-renewable duration of use and their eventual disposal adds to environmental pollution. Chemiluminescent light tubes can be bulky. Incandescent bulbs are not particularly suitable for use in light sticks, since such bulbs typically emit light omnidirectionally, and so require lenses and/or mirrors to focus and redirect the light, making them expensive to manufacture. Incandescent bulbs also require relatively larger batteries for power.

It is therefore an object of the present invention to provide a light stick which uses a replaceable light source, that uses low-power batteries, that is compact and inexpensive to manufacture, and that has a minimum negative impact on the environment.

SUMMARY OF THE INVENTION

The above objects and further advantages are achieved by the light stick of the invention which includes an elongated member formed of a light-transmitting impact-resistant material, the exterior surface of which is provided with a plurality of spaced recesses or grooves that have the effect of refracting and reflecting the light from the interior portion of the tube and transmitting it outwardly from the surface. In one preferred embodiment, the surface is provided with a plurality of grooves having sidewalls forming an angle with a plane normal to the longitudinal axis of the elongated member. As will be described below, the grooves can be formed in other configurations.

At least one end of the tube is provided with a recess or an aperture for receiving a light source that includes at least one light-emitting diode (LED). The light from the LED is directed into the interior of the tubular member. The plurality of grooves refract and reflect the light traveling along the length of the tubular member to enhance the uniformity and brightness of the light emitted outwardly from the tube along the longitudinal length of the tube's exterior surface.

BRIEF DESCRIPTION OF THE PREFERRED EMBODIMENTS

Preferred embodiments of the invention are described herein below and with reference to the attached drawings, wherein:

FIG. 1 is a top plan view of a light stick in accordance with the present invention;

FIG. 2 is a cross-sectional view of the light stick of FIG. 1 taken along line 2—2.

DETAILED DESCRIPTION OF THE INVENTION

Figure 3:
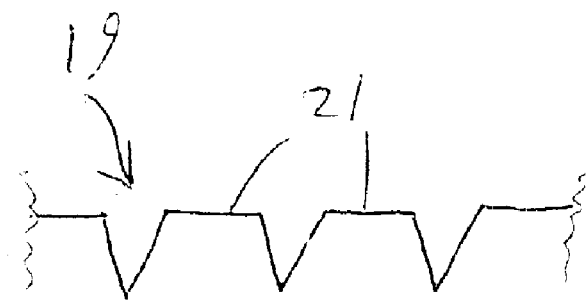
FIGS. 3–5 are partial cross-sectional views of alternative embodiments of the light stick.

Referring to FIG. 1, a light stick 10 is shown formed as an elongated tubular member 12 having light transmitting walls 11 and exterior surface 14. A plurality of spaced-apart rectilinear grooves or serrations 16 extend radially from the surface 14 into the wall 11. The grooves 16 can be formed by machining the tube 10, or by molding at the time the tube 10 is manufactured. The thickness of wall 11 and depth of grooves 2 or other regularly-spaced recesses can be varied. It will be understood that the depth and size of the recesses should not adversely effect the structural integrity of the tube which may foreseeably be subjected to bending and torsional forces during use. The grooves can be formed continuously in the form of a spiral or as a plurality of parallel radial formations.

The tubular member 12 can have a circular cross-section, rectangular and/or a combination of both, and can be rigid or flexible. The tubular member 12 can be composed of plastic, such as molded plastic including acrylic, the grooves or serrations 16 being formed during the fabrication process. The function of these recesses is to refract and reflect light from the interior to be emitted radially or outwardly away from the longitudinal axis of the tubular member 12.

The light-transmitting wall 11 and its exterior surface 14 can be transparent or translucent, for example, and be of any desired color or colors and/or to provide a frosted appearance. Additional aesthetic and functional effects can be achieved in accordance with methods known in the optical arts, including the addition of reflective powders, foils or other light scattering materials.

The plurality of grooves 16 or other recess provide reflecting and refracting surfaces, and so transmit the light traveling along the length of the tubular member 12 to radiate outwardly and thereby to enhance the brightness of the light emitted from the exterior surface 14.

Figure 4:
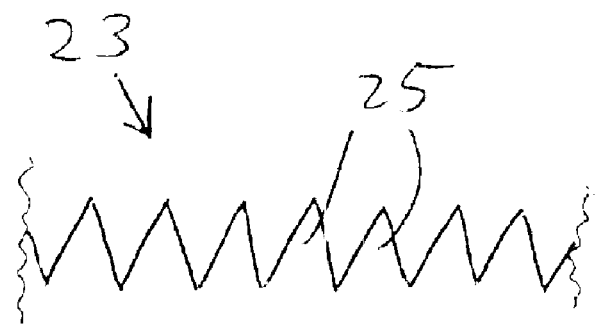

In one preferred embodiment the tube is made of a clear acrylic polymer and the grooves are 1 mm. wide, 1 mm. deep and spaced at 1 mm. adjacent intervals. As shown in FIG. 2, each of the plurality of grooves 16 is rectilinear and has a square tooth shape 17. In an alternative embodiment shown in FIG. 3, a partial cross-sectional view of the tube 10 illustrates that each of the plurality of grooves 19 has a truncated triangular sawtooth shape 21. In another alternative embodiment shown in FIG. 4, a partial cross-sectional view of the tube 10 illustrates that each of the plurality of grooves 23 has an untruncated triangular sawtooth shape 25.

Figure 5:
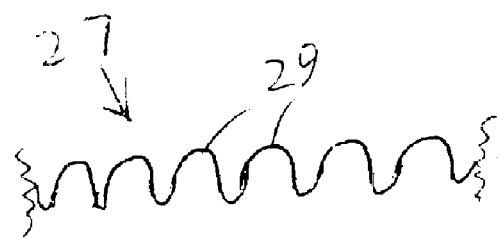

In still another alternative embodiment shown in FIG. 5, a partial cross-sectional view of the tube 10 illustrates that each of the plurality of grooves 27 has a wave-like and/or sinusoidal shape 29. Other functional and aesthetic light-transmitting effects can be achieved by varying the spacing, depth, overall shape, angle of the sidewalls and finish of the surfaces of the grooves. Other shapes can include rounded and curvilinear alone and/or in combination with straight elements.

At least one end of the tube 10 is formed with an aperture 18 to receive the light source 20. As shown in FIG. 2, the aperture 18 is adapted to receive and removably retain a light source 20, for example, in a friction fit. The light source 20 includes a light emitting diode (LED) 22, that is oriented toward the interior 24 of the tubular member 12. An LED having a beam angle in the range of 10° to 45° is directed into the interior 24 of the tubular member 12. The LED 22 can be an off-the-shelf commercial product have predetermined beam angles, for example, providing ambient light in a range of directions. Such predetermined beam angles are available in 1° increments ranging between 10° to 45°.

The light source and internal surface of the recess in the elongated member can be provided with complementary threads, or with a bayonet-type attachment means to provide a more secure, but removable way of joining the elements.

The light source 20 is replaceable and provides a relatively bright source of light at a relatively low power consumption. Small but efficient disk-shaped batteries can advantageously be utilized. The light source 20 can include components and circuitry to provide special effects and features as described in U.S. Pat. No, 6,120,162, the disclosure of which is incorporated herein by reference.

The light stick 10 can be used as a hand-held illumination device or, alternatively, as illumination for the interior of an accessory such as a handbag, purse or fanny pack. Sufficient illumination is provided to be used to light the interior of a camping tent.

In a further preferred embodiment, the light stick 10 can also include an integral or removable whistle 26. Thus, the user can use the light stick 10 as a safety device to illuminate a path and, if circumstances require, to summon help by blowing the whistle at the opposite open end of the tubular member 12. The whistle function can be enhanced to permit multiple tones or pitches for use in signaling or as a musical instrument by providing one or a plurality of apertures 27 along the length of the tube 12. The light stick 10 can be illuminated and played as a simple flute or recorder to thereby create a novel and attractive aesthetic effect.

The light stick of the invention can be fabricated inexpensively to provide a source of area illumination to illuminate a smaller confined area, such as a handbag or briefcase, and to also function as a hand-held safety beacon which can be seen by others over a great distance and from all angles.

Other variations and modifications to the novel construction will be apparent to those of ordinary skill in the art and the scope and protection to be accorded the invention is to be determined with reference to the claims that follow.

I claim:

1. A light stick for providing illumination comprising:
    an elongated tubular member formed of light-transmitting material, the elongated tubular member having:
        a longitudinally-extending empty interior space within the elongated tubular member;
        an exterior surface of the elongated tubular member being provided with a plurality of longitudinally spaced grooves;
        an aperture formed in a first end of the elongated tubular member; and
        a retaining recess positioned in the first end and separate from the longitudinally-extending empty interior, space the retaining recess including an internal surface for receiving and retaining a light source inserted through the aperture to direct light into the empty interior of the elongated tubular member;
    wherein the light source is retained only in the retaining recess; and
    wherein the plurality of grooves reflect the light transmitted into the empty interior along the length of the elongated tubular member to enhance the brightness of the light radiated outwardly from the exterior surface of the elongated tubular member.

2. The light stick of claim 1, wherein the plurality of grooves are regularly spaced, parallel grooves extending circumferentially around the exterior surface of the elongated tubular member.

3. The light stick of claim 1, wherein the plurality of grooves are formed as a spiral groove extending along the exterior surface.

4. The light stick of claim 1, wherein the plurality of grooves are discrete geometric shapes that extend less than the full circumference of the elongated tubular member.

5. The light stick of claim 1, wherein the light source is a battery-powered light emitting diode (LED).

6. The light stick of claim 5, wherein the light source is removably secured in the retaining recess at the first end of the elongated tubular member.

7. The light stick of claim 1, wherein the light source is actuated by a pushbutton switch.

8. The light stick of claim 1, wherein the elongated tubular member is composed of an acrylic polymer.

9. The light stick of claim 8, wherein the elongated tubular member and plurality of grooves are formed by molding.

10. The light stick of claim 1, wherein the elongated tubular member is transparent.

11. The light stick of claim 10, wherein a portion of the exterior surface of the elongated tubular member is translucent.

12. The light stick of claim 1, wherein the elongated tubular member is tinted.

13. The light stick of claim 1, wherein the elongated tubular member is provided with optical-property modifying additives selected from the group consisting of solid particles and dissolved chemical substances, or both.

14. The light stick of claim 5, wherein the LED has a beam angle in the range of 10° to 45°.

15. The light stick of claim 1, that further comprises an integral whistle.

16. The light stick of claim 15, wherein the whistle is multi-toned.

17. The light stick of claim 15, wherein the whistle is integrally formed in a second end of the elongated tubular member longitudinally opposite the first end.

18. The light stick of claim 7, wherein the light source comprises a multi-position switch and circuit means for providing a flashing mode of operation of the light source.

* * * * *